Dec. 22, 1970  MASATOSHI TOYODA  3,550,052
ELECTROMAGNETICALLY PROPELLED APPARATUS
Filed April 28, 1969
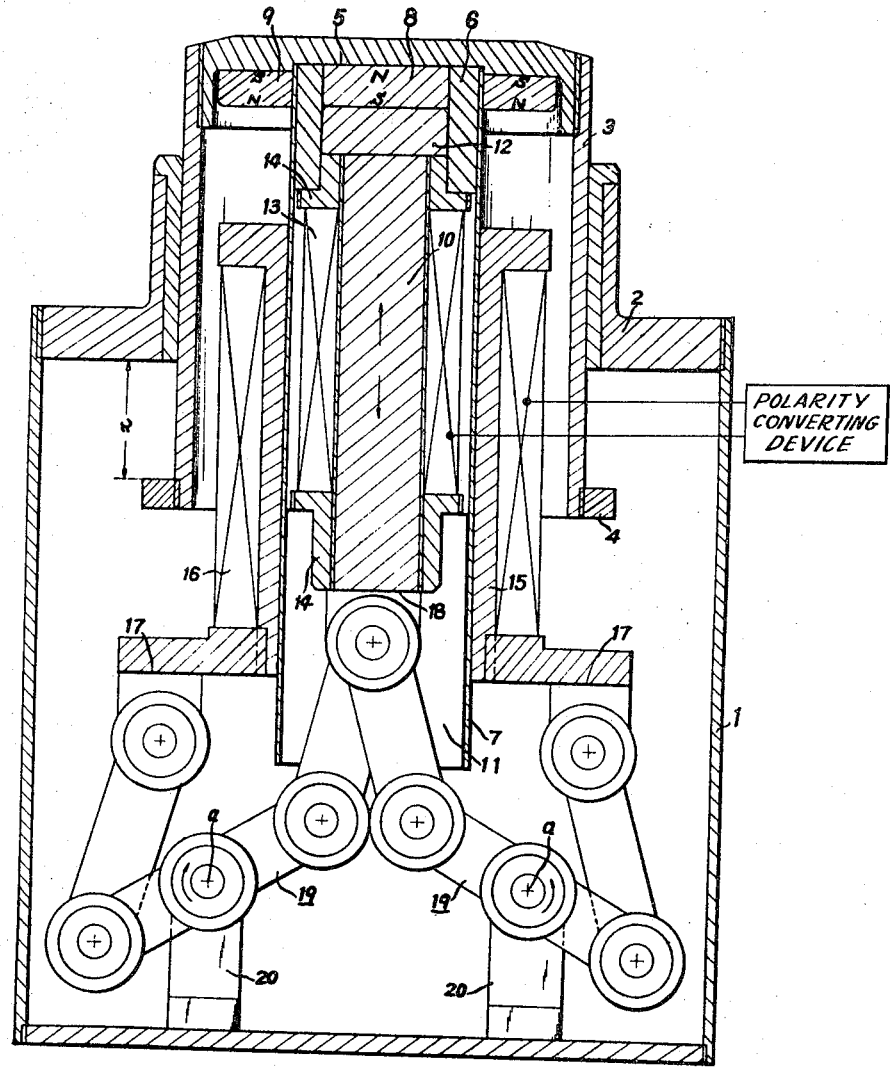
INVENTOR.
Masatoshi Toyoda
BY George B. Ayerolf
Attorney United States Patent Office 3,550,052
Patented Dec. 22, 1970

3,550,052
ELECTROMAGNETICALLY PROPELLED
APPARATUS
Masatoshi Toyoda, 1–14–9 Asakusa, Taito-ku,
Tokyo, Japan
Filed Apr. 28, 1969, Ser. No. 819,718
Claims priority, application Japan, May 4, 1968,
43/29,728
Int. Cl. H01f 7/08
U.S. Cl. 335—234                    2 Claims

ABSTRACT OF THE DISCLOSURE

An electromagnetically propelled apparatus wherein the opening of an inner casing fits in with the opening of an outer casing, said inner casing is slidably disposed, the peripheral portion of the outer casing is provided with an annular stop member bent in a L-shape cross section, the peripheral portion of the inner casing has a stop member, these stop members being intended to cooperate in preventing the inner casing from falling off the apparatus, there are disposed on the inner bottom plane of the inner casing two or more permanent magnets so arranged as to cause the opposite polarities thereof to face each other, there are also provided two or more electromagnetic devices at opposite positions to said permanent magnets, whereby the polarities of these electromagnetic devices are switched over so as to cause them alternately to impinge on the permanent magnets and in consequence the inner and outer casings to be propelled by turns.

---

The present invention relates to an electromagnetically propelled apparatus comprising an inner casing slidably fitted into an outer casing and electromagnetic devices enclosed in the space defined by these casings and capable of allowing the casings themselves to be propelled at an accelerated speed by switching over the polarities of the electromagnetic devices.

Already known is an electromagnetically propelled apparatus of the type wherein electromagnetic devices are allowed to perform the action of attraction and repulsion through the free switchover of their polarities and thereby reciprocate a linear motion. However, said electromagnetic devices using an electromagnetic force are limited in the range of their linear motion, and moreover the apparatus itself is generally stationary. At the present time there is not yet developed such type of electromagnetically propelled apparatus as is capable of driving itself including an electromagnetic device continuously at an accelerated speed.

In view of the aforementioned present situation, the object of the present invention is to provide an electromagnetically propelled apparatus which comprises casings capable of propulsion and electromagnetic devices housed in the casings, whereby the casings themselves are propelled at an accelerated speed by an impinging force repeatedly generated outward in the direction in which said casings move forward.

Accordingly, the electromagnetically propelled apparatus of the present invention need not be fixed at a given location. In so far as the external supply of energy is assured, it is capable of infinitely continuing travel. Further, the apparatus can proceed at an accelerated speed even through the open air or space, depending on the manner in which the intensity of the impinging force, the gravity of the apparatus and other related factors are controlled. Accordingly, the present invention has the advantage that it is applicable over an extremely broad field, for example, as a source of motive power for vehicles, flying bodies or toys resembling them.

The appended drawing is a section of the main part of an embodiment of the present invention.

There will now be described an embodiment of the present invention by reference to the drawing.

To the opening of an outer casing 1 is screwed, as illustrated, an annular bent member 2 acting as a stopper. In the inside of the outer casing is detachably disposed an inner casing 3. To the periphery of the opening of the inner casing 3 is screwed another annular stop member 4. When the inner casing 3 is pushed upward in the outward direction, this annular stop member 4 strikes against the aforesaid annular bent stop member 2 to be stopped thereby, helping to prevent the inner casing 3 from jumping outside. Approximately at the central part of the inner bottom plane 5 of the inner casing 3 is positioned a cylindrical support 6 with its inner end embedded therein. There is similarly embedded another cylindrical member 7 in the inner bottom plane 5 of the inner casing 3 with the inner surface of the inner end of said member 7 closely attached to the outer circumference of the aforementioned cylindrical support 6. Within this support 6 is fitted a disk-form permanent magnet 8 of the indicated polarity in close contact with the inner bottom plate 5 of the inner casing 3. On said inner bottom plate 5 there is fixed an annular permanent magnet 9 in contact with the outer circumference of the cylindrical member 7 in such a manner that the opposite polarities of these permanent magnets 8 and 9 face each other. Into the cylindrical member 7 is slidably inserted in its lengthwise direction a magnetic rod member 10 with one of its ends supported by a support member 11. The inmost end of said rod member 10 is fitted with a head 12 which slides through the cylindrical support 6 and impinges on the disk-form permanent magnet 8. Around the magnetic rod member 10 is wound an exciting coil 13 which is supported on both sides by a pair of annular supports 14. Around the cylindrical member 7 is disposed a magnetic cylindrical support 15 which can slide over the circumferential surface of said member in its lengthwise direction. The magnetic cylindrical support 15 is wound with an exciting coil 16. These exciting coils 13 and 16 are alternately energized and deenergized by the same or separate automatic polarity converting devices. The outer bottom plane 17 of the magnetic cylindrical support 15 and the outer bottom plane 18 of the magnetic rod member 10 are joined by a pair of toggle joints 19—19, which are respectively supported on support stands 20 fixed to the inner bottom plane of the outer casing 1. The aforementioned permanent magnets 8 and 9 may be replaced by a different type of magnetic element.

There will now be described the operation of the electromagnetically propelled apparatus of the present invention arranged as described above. The drawing represents the case where the exciting coil 13 is energized by the aforementioned automatic polarity converting device in such a manner as to cause the head 12 of the magnetic rod member 10 to assume the polarity of N. This energization allows the magnetic rod member 10 to be attracted to the disk-form permanent magnet 8 and rapidly lifted in the direction of the indicated upturned arrow. Just before the head 12 impinges on the disk-form permanent magnet 8, the excited magnetic pole of the magnetic cylindrical support 15 facing the annular permanent magnet 9 is deenergized due to the exciting coil 16 being automatically cut off, thereby causing said magnetic cylindrical support 15 to be removed in the repulsive direction with respect to the annular permanent magnet 9. Aided by said recoil motion, the magnetic rod member 10 is allowed vigorously to strike the disk-form permanent magnet 8, causing the inner casing 3 to be pushed upward as illustrated. Though this tossing would most likely drive the inner casing 3 out of the apparatus, the aforementioned annular stop member 4 strikes against the aforesaid annular bent stop member 2 to be stopped thereby, only permitting the inner casing 3 to be pushed up within the range of a distance $x$.

After lapse of a prescribed time, the automatic polarity converting device is again actuated to cause the magnetic cylindrical support 15 to have an opposite polarity to that of the annular permanent magnet 9. Since the paired toggle joints 19—19 respectively rotate in the direction of the arrow around the fulcrum $a$, the magnetic cylindrical support 15 rapidly rises toward the annular permanent magnet 9. Immediately before the magnetic cylindrical support 15 impinges on the annular permanent magnet 9, the magnetic rod member 10 already attracted to the disk-form permanent magnet 8 is removed in the repulsive direction as indicated by the downward turned arrow by deenergizing the exciting coil 13 for release of its excitation. This recoil movement causes the magnetic cylindrical support 15 to impinge on the annular permanent magnet 9 more vigorously than before and in consequence the inner casing 3 to be tossed upward as shown, namely, to be propelled forward.

According to the foregoing embodiment, repulsion from the permanent magnet was effected by deenergizing the exciting coil. However, it is possible to carry out said repulsion by changing the direction of conducting the exciting coil so as to cause it to have the same polarity as that of the permanent magnet.

As mentioned above, the present invention enables the inner casing 3 and outer casing 1 to be propelled at an accelerated speed by alternately changing the excited polarity of the annular support member 14 and magnetic cylindrical support 15 or alternately carrying out magnetization and demagnetization by means of an automatic polarity converting device, causing the disk-form permanent magnet 8 and annular permanent magnet 9 alternately to be pushed up by impingement in their forward direction, and repeating said operation.

Accordingly, the present invention is capable of driving forward the entire electromagnetically propelled apparatus including the electromagnetic devices at an accelerated speed without restriction on the extent of its forward travel. Further, proper choice of the magnitude of the force with which the electromagnetic device impinges on the permanent magnet, the gravity of the entire apparatus and other related factors would enable said apparatus to travel even through the open air or space, thus offering the great advantage of making the apparatus applicable over an extremely broad field.

What I claim is:

1. An electromagnetically propelled apparatus comprising inner and outer casings disposed slidably in the direction of their forward travel, a pair of magnetic elements positioned on the inner bottom plane of the respective casings in the direction of their forward drive with their opposite polarities facing each other, a pair of electromagnetic devices so disposed as to face said magnetic elements respectively, a toggle joint mechanism joining said electromagnetic devices and causing them alternately to reciprocate in a linear movement, an automatic polarity converting device for alternately exciting the paired electromagnetic devices so as to cause them alternately to impinge on each of the opposite paired magnetic elements, characterized in that said impingement allows the inner and outer casings to be propelled at an accelerated speed in the direction of said impingement.

2. An electromagnetically propelled apparatus according to claim 1 wherein the magnetic element consists of a permanent magnet.

References Cited

UNITED STATES PATENTS

| | | | |
|---|---|---|---|
| 2,361,810 | 10/1944 | Bazley | 74—110 |
| 2,462,482 | 2/1949 | Evans | 74—110X |
| 3,376,528 | 4/1968 | Macy | 335—298X |

GEORGE HARRIS, Examiner

U.S. Cl. X.R.

74—110